United States Patent Office 2,773,856
Patented Dec. 11, 1956

2,773,856

TREATMENT OF SYNTHETIC POLYMERIC MATERIALS TO IMPART DYE AFFINITY THERETO

Robert Meyer, Tassin-la-Demi-Lune, and Pierre Alphonse Garnier, Lyon, France, assignors to Societe des Usines Chimiques Rhone-Poulenc No Drawing. Application March 3, 1952,
Serial No. 274,672

Claims priority, application Great Britain March 12, 1951

5 Claims. (Cl. 260—79.3)

The present invention relates to the treatment of synthetic polymeric materials and particularly to processes for facilitating the dyeing of polyacrylonitrile and its copolymers.

It is known that polyacrylonitrile and other such synthetic polymeric materials containing nitrile groups, which may be formed into filaments, films and the like having excellent mechanical properties, have little or no affinity for acid dyestuffs such as are used in dyeing wool.

It is an object of the present invention to provide a method of treating such synthetic polymeric materials so that they acquire an affinity for acid dyestuffs and may, therefore, be dyed therewith.

According to the present invention, synthetic polymeric materials which contain nitrile groups, more especially polyacrylonitrile and its copolymers, are mixed in solution with suitable organic nitrogenous bases in the presence of sulphonic acid. In the solid state, the resulting polymeric materials have an affinity for acid dyestuffs. Results of varying degree, in terms of affinity for acid dyestuffs, are obtained according to the particular reagents employed, but it is a simple matter to determine for any particular polymeric material the most suitable base to employ and the most suitable acid for use with that base.

The invention may be applied to the various synthetic polymers or copolymers which contain nitrile groups. Examples are polyacrylonitrile and copolymers thereof with such compounds as acrylamide, acrylic esters, and the like.

The organic nitrogenous bases employed in accordance with the invention are the aliphatic and alicyclic, primary and secondary amines which contain not more than 10 carbon atoms. Examples are: diethylamine, n-butylamine, ethylenediamine, hexamethylenediamine, decamethylenediamine and cyclohexylamine. The results qua affinity for acid dyestuffs of the treated polymer rapidly deteriorate with increase in the number of carbon atoms in said amine above the limit specified.

Typical examples of sulphonic acids suitable for use in carrying out the invention are the benzene, toluene and methane sulphonic acids. If desired, these acids may be used in conjunction with the inorganic substances of acid character disclosed in the specification of abandoned co-pending application Ser. No. 274,671, filed March 3, 1953, such as zinc chloride, boric acid and boron trifluoride.

The organic nitrogenous base and the sulphonic acid may be employed in equimolecular proportions, in, for example, the form of a salt, but it is also possible to employ different proportions.

The amounts of acid and amine can vary within wide limits but, in general, amounts of not less than 3 and not more than 15% of the total weight of the mixture are satisfactory. It is to be understood that in any event the quantity of amine employed is in excess of that which may be present as incidental impurity in the polymeric material treated.

The treatment of the synthetic polymeric material is effected while the polymer is in solution, a convenient solvent being dimethylformamide. The amine and the acid, or a salt thereof in the presence or absence of an additional amount of the same or different acid or base, are or is added to the solution which is then heated to a temperature sufficient to obtain an adequate rate of reaction. A temperature of between 80° and 150° C. is generally satisfactory. The period of contact varies from several minutes to several hours according to the nature of the reagents present and the temperature employed. The optimum conditions for each particular case may be readily determined by testing the dyeing affinity of the product obtained, which can be done very simply, for example, as follows: samples of the solution are evaporated and the resultant solid is treated in a boiling acetic-sulphuric acid bath for one hour with an acid dyestuff, such as Cyanol F. F. G., whereupon the product is washed in boiling water until the washing water is colourless and the extent of colouration of the product is observed.

The Cyanol dyestuff referred to has the formula

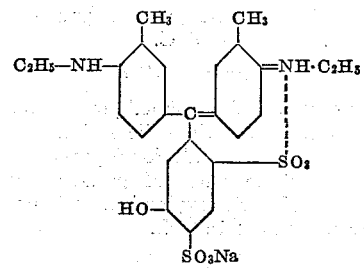

The following examples will serve to illustrate the invention. The solutions obtained yield on evaporation solid products which fix acid dyestuffs under the conditions hereinbefore specified. According to the conditions under which the evaporation of the solution is effected, the solid products may be obtained in the form of filaments or films or the like.

Example I 3.5 parts of para-toluene sulphonic acid and 2.8 parts of n-butylamine are added to 60 parts of a 16.7% dimethylformamide solution of polyacrylonitrile, and the mixture is heated for 30 minutes on a boiling water bath or for 15 minutes at 120° C.

The solution is cast to form a film and dried whereby a film is obtained which has affinity for acid dyestuffs.

The following examples illustrate other methods of treating polyacrylonitrile and copolymers thereof, the polymers obtained all showing affinity for acid dyestuffs when treated according to the method above described.

Example II

To 60 parts of a 16.7% dimethylformamide solution of polyacrylonitrile is added the following composition:

| | Parts |
|---|---|
| Para-toluene-sulphonic acid | 3.5 |
| Hexamethylene diamine | 2.2 |

The mixture is reacted for 30 minutes on a boiling water bath or for 15 minutes at 120° C.

Example III

To 60 parts of a 16.7% dimethylformamide solution of polyacrylonitrile are added 4.4 parts of the para-toluene-sulphonic basic salt of ethylene diamine (obtained by adding 1 mol of para-toluene-sulphonic acid to an aqueous solution of 1 mol of ethylene diamine and evaporating the mixture to dryness under reduced pressure). The solution is heated for 30 minutes on a boiling water bath.

Example IV

To 60 parts of a 16.7% dimethylformamide solution of polyacrylonitrile are added 4.6 parts of butylamine para-toluene-sulphonate and 0.5 part of anhydrous zinc chloride, and the mixture is heated for 15 minutes at 140° C.

Example V

To 60 parts of a 16.7% dimethylformamide solution of polyacrylonitrile are added 3.5 parts of para-toluene-sulphonic acid and 4 parts of cyclohexylamine and the mixture is heated for 15 minutes at 140° C.

Example VI

To 60 parts of a 16.7% dimethylformamide solution of polyacrylonitrile are added 3.5 parts of para-toluene-sulphonic acid and 3 parts of diethylamine, and the mixture is heated for 15 minutes at 140° C.

Example VII

To 60 parts of a 16.7% dimethylformamide solution of a copolymer of polyacrylonitrile and methyl acrylate (containing one part of acrylate for 9 parts of polyacrylonitrile) are added 3.5 parts of para-toluene-sulphonic acid and 4 parts of cyclohexylamine, and the mixture is heated for 15 minutes at 140° C.

Example VIII

To 60 parts of a 16.7% dimethylformamide solution of a copolymer of polyacrylonitrile and acrylamide (containing one part of acrylamide for 9 parts of polyacrylonitrile) are added 3.5 parts of para-toluene-sulphonic acid and 4 parts of cyclohexylamine, and the mixture is heated for 15 minutes at 140° C.

Example IX

To 120 parts of a 16.7% dimethylformamide solution of polyacrylonitrile are added 3.2 parts of butylamine methane sulphonate and 1.4 parts of n-butylamine, and the mixture is heated for 15 minutes at 140-145° C.

We claim:

1. A method of treating an acrylonitrile polymer, which material may be formed into filaments and the like and which has substantially no affinity for acid dyestuffs, to confer upon the product an affinity for acid dyestuffs when in the solid state, which method comprises heating said polymer in solution with a hydrocarbon sulphonic acid and a hydrocarbon amine selected from the class consisting of those primary and secondary aliphatic and alicyclic amines containing not more than 10 carbon atoms in the molecule, the combined quantity of amine and sulphonic acid being not less than 23% and not greater than 75% of the weight of the polymer, and removing the solvent of the said solution to form a solid composition of the said polymer, amine and sulphonic acid.

2. A method of treating an acrylonitrile polymer, which material may be formed into filaments and the like and which has substantially no affinity for acid dyestuffs, to confer upon the product an affinity for acid dyestuffs when in the solid state, which method comprises heating said polymer in solution with a hydrocarbon sulphonic acid and a hydrocarbon amine selected from the class consisting of those primary and secondary aliphatic and alicyclic amines containing not more than 10 carbon atoms in the molecule, at least one of said amine and said sulphonic acid being at least partly in the form of an acid addition salt and the combined quantity of amine and sulphonic acid being not less than 23% and not greater than 75% of the weight of the polymer, and removing the solvent of the said solution to form a solid composition of the said polymer, amine and sulphonic acid.

3. A method of treating an acrylonitrile polymer, which material may be formed into filaments and the like and which has substantially no affinity for acid dyestuffs, to confer upon the product an affinity for acid dyestuffs when in the solid state, which method comprises mixing said polymer in solution with a hydrocarbon sulphonic acid and a hydrocarbon amine selected from the class consisting of those primary and secondary aliphatic and alicyclic amines containing not more than 10 carbon atoms in the molecule and heating the mixture in a common solvent, the combined quantity of amine and sulphonic acid being not less than 23% and not greater than 25% of the weight of the polymer, and removing the solvent of the said solution to form a solid composition of the said polymer, amine and sulphonic acid.

4. A method of treating an acrylonitrile polymer, which polymer may be formed into filaments and the like and which has substantially no affinity for acid dyestuffs, to confer upon the same an affinity in the solid state to acid dyestuffs which comprises heating a mixture of the polymer, a solvent therefor, a hydrocarbon amine selected from the class consisting of those primary and secondary aliphatic and alicyclic amines containing not more than 10 carbon atoms in the molecule and a hydrocarbon sulphonic acid selected from the benzene, toluene and methane sulphonic acids, the combined quantity of amine and sulphonic acid being not less than 23% and not greater than 75% of the weight of the polymer, and removing the solvent of the said solution to form a solid composition of the said polymer, amine and sulphonic acid.

5. A method as claimed in claim 4 in which the solvent is dimethylformamide.

References Cited in the file of this patent

UNITED STATES PATENTS

| | | |
|---|---|---|
| 2,468,330 | Kropa | Apr. 26, 1949 |
| 2,529,315 | Serniuk | Nov. 7, 1950 |
| 2,572,954 | Schwartz | Oct. 30, 1951 |
| 2,595,575 | Ham | May 6, 1952 |
| 2,624,725 | Bjorksten et al. | Jan. 6, 1953 |
| 2,635,092 | Ham | Apr. 14, 1953 |

FOREIGN PATENTS

| | | |
|---|---|---|
| 613,817 | Great Britain | Dec. 3, 1948 |
| 613,818 | Great Britain | Dec. 3, 1948 |